United States Patent [19]

Wille

[11] 3,900,609

[45] Aug. 19, 1975

[54] METHOD FOR MANUFACTURE OF A REFRACTING, LIGHT PERMEABLE OXIDE LAYER

[75] Inventor: Baptist Wille, Balzers, Liechtenstein

[73] Assignee: Balzers Patent - und Beteiligungs - Aktiengesellschaft, Liechtenstein

[22] Filed: June 4, 1973

[21] Appl. No.: 366,482

Related U.S. Application Data

[62] Division of Ser. No. 132,041, April 7, 1971, Pat. No. 3,783,010.

[30] Foreign Application Priority Data

Apr. 13, 1970 Switzerland.................... 005491/70

[52] U.S. Cl. .............................................. 427/166
[51] Int. Cl. ..................... C23c 11/00; C23c 13/00
[58] Field of Search........... 117/106 R, 169 R, 33.3, 117/221

[56] References Cited
UNITED STATES PATENTS

| | | | |
|---|---|---|---|
| 2,904,452 | 9/1959 | Reichelt.......................... | 117/106 R |
| 3,502,502 | 3/1970 | Elsby............................ | 117/106 R X |
| 3,783,010 | 1/1974 | Wille............................. | 117/106 R |

*Primary Examiner*—Ralph S. Kendall
*Assistant Examiner*—Harris A. Pitlick
*Attorney, Agent, or Firm*—Toren and McGeady

[57] ABSTRACT

A highly refracting, light permeable oxide layer on a support, such as a glass plate, comprises oxygen, zirconium and tantalum, the ratio of the number of tantalum atoms to zirconium atoms being in the range of about 1 : 1 to 1 : 2.

The application also discloses a method for producing highly refracting, light permeable oxide containing layers on supports, such as of glass, wherein a mixture of metals and/or metal oxide is heated under vacuum conditions to form a vapor which is condensed on the support to form a deposit or layer thereon. According to the inventive method, the mixture which is subjected to the vaccum deposition comprises zirconium and tantalum in metallic or oxidic form, at least one of the tantalum or zirconium, however, being present in oxide form.

7 Claims, 1 Drawing Figure

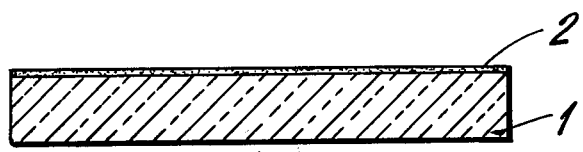

METHOD FOR MANUFACTURE OF A REFRACTING, LIGHT PERMEABLE OXIDE LAYER

This is a division of application Ser. No. 132,041, filed on Apr. 7, 1971 and now U.S. Patent No. 3,783,010.

FIELD OF INVENTION

The invention relates to the production of optical layers by vacuum deposition.

BACKGROUND INFORMATION AND PRIOR ART

It is well known that thin oxide layers are used to a very large extent and for various purposes as protective layers and as layers for optical purposes. Oxidic protecting layers serve, for example, the purpose to protect sensitive surfaces of, for example, lenses, surface mirrors and the like objects against corrosion and mechanical injury or damage. In the optical industry, oxidic layers are commonly used as reflection reducing coatings, interference filters, beam or ray dividers, heat filters, cold light mirrors and coatings for spectacle lenses and the like. As is well known in the art, the mechanical and optical characteristics of such oxidic layers are dependent not only on the nature of the oxide which has been deposited on the respective surface, but also to a very pronounced extent on the manner in which the layer has been deposited. Although considerable research has been done in this field, the choice for suitable, highly refractive layers for optical purposes is very small, particularly if the layer is to meet stringent requirements in respect to homogeneity and nonabsorption.

It is known to produce oxide layers by direct evaporation of oxidic starting materials in a vacuum and subsequent condensation of the vapors on the support to be coated. This commonly used procedure has considerable disadvantages if the deposited layer is to be used for optical purposes because most oxides upon evaporation and subsequent condensation under vacuum conditions yield absorbing layers. This also holds true if the starting materials are absorption-free oxides. At the present state of the art, it is known that the reason for this phenomenon is that most oxides are reduced by the evaporation in a vacuum, and the unsaturated oxides exhibit optical absorption. Only a few exceptions are known in this respect: Thus for example, $SiO_2$ can be vaporized in a vacuum by means of an electron beam to produce absorption-free layers.

With a view to circumnavigating these difficulties in the production of absorption-free oxide layers, a number of other processes has been developed. It has thus been suggested to produce absorption-free metal oxide layers by vacuum deposition of the respective metals and subsequent oxidation of the metals or by cathode atomization of the metals in an oxygen atmosphere. It has also been proposed to deposit the starting substances in an oxidizing atmosphere.

According to another known procedure for the production of absorption-poor oxide layers by vaporizing an oxidic starting substance or a starting substance which is capable of being oxidized, the starting substance or substances is or are admixed with one or several rare earth elements or compounds.

For many optical applications of layers which have been deposited by vapor deposition, it is important that the layers are homogeneous, to wit, that their optical characteristics are uniform throughout all portions of the layer. This is so because layer systems, for example, reflection reducing coatings which consist of two layers are almost always calculated under the assumption that the system consists of homogeneous layers because non-homogeneous layers cannot be produced in a reproducible manner. For the manufacture of such layer systems it is then a precondition that the homogeneous layers which form the basis for the calculation are in fact present.

It is an extremely disturbing factor in interference layer systems that many layers have the characteristic that their index of refraction is not constant in the direction perpendicular to the plane of the layer. In the following, the layers in which the index of refraction decreases in the course of the layer formation, to wit, with increasing layer thickness, are referred to as "negative-inhomogeneous" while layers in which the index of refraction increases with increasing layer thickness, are referred to as "positive-inhomogeneous". Experience has indicated that there is always a tendency towards inhomogeneity of the index of refraction, particularly with the presently known highly refracting layers and to the extent that such layers can be considered for opticaltechnical use due to their absorption and mechanical characteristics. The particular extent or degree of the inhomogeneity is subject to strong fluctuations, dependent on the manufacturing conditions.

Thus, for example, zirconium oxide layers which, due to their high index of refraction and their nonabsorptiveness in the visible spectral region and their mechanical characteristics have been proposed for the construction of optical layer systems, unfortunately exhibit a very pronounced negative inhomogeneity. This strongly reduces, for example, the effectiveness of a reflection-reducing coating composed of such a layer. Various attempts have been made to eliminate this negative inhomogeneity by changing the deposition procedure, but all these attempts have failed.

Some deposited layers exhibit a positive inhomogeneity. There are uses in the optical technology in which such positive inhomogeneity can be accepted, for example, in the highly refracting first layer of a reflection-reducing coating consisting of two layers.

SUMMARY OF THE INVENTION

It is a primary object of the invention to overcome the disadvantages of the prior art oxidic layers and to produce a light permeable layer by vacuum deposition on a support which does not exhibit the undesired negative inhomogeneity characteristic, which has a high index of refraction and which is exceedingly resistant to mechanical and chemical influences.

Another object of the invention is to provide a method for producing a layer of this kind which is exceedingly simple to carry out with a minimum of expenditure.

It is also an object of the invention to provide a procedure for forming a superior optical layer on a support, wherein the starting materials can be readily vacuum-deposited on the support.

Generally, it is an object of the invention to improve on the art of vapor deposition of layers on supports.

Briefly, and in accordance with the invention, the above objects are superiorly achieved by providing a layer on a support, which layer essentially consists of oxygen, zirconium and tantalum, the ratio of the number of tantalum atoms to zirconium atoms being in the range of 1 : 1 to 1 : 2.

According to the inventive procedure for producing a highly refracting, light permeable oxide layer on a support, a mixture containing the elements zirconium and tantalum in metallic or oxidic form, at least one of the elements being present in oxidic form, is heated under vacuum conditions to vaporize the mixture, whereupon the vapor is condensed on the support to be coated.

The invention will now be described by a number of examples, it being understood, however, that these examples are given by way of illustration and not by way of limitation, and that many changes may be effected without affecting in any way the scope and spirit of the invention as recited in the appended claims.

EXAMPLE 1

This test was carried out in a heatable vaporizing crucible of a vacuum deposition plant. For the purpose of producing an optical layer, a mixture consisting of 30 percent of metallic tantalum, calculated on the weight of the total mixture, and 70 percent of zirconium oxide ($ZrO_2$) were inserted into the crucible. The crucible was heated with a wattage of about 2.5 kW. This resulted in a temperature of the mixture in the crucible of about 1800°C. A support in the form of a glass plate was arranged in the plant opposite the crucible, and the heating resulted in vaporization of the material in the crucible and the deposition of a layer of a thickness of 250 nm with a growing speed of 35 nm per minute. The temperature of the glass plate was about 300°C. The vapor deposition was carried out in known manner in an oxygen atmosphere of $10^{-4}$ mmHg. A layer was obtained which adhered satisfactorily to the glass plate, which was hard and completely absorption-free in the visible spectral region. The layer had a constant index of refraction of $n = 2.05$ throughout its entire thickness.

The constant index of refraction can be easily confirmed by proceeding in the following manner:

A layer to be investigated is vapor-deposited on a glass plate with a low index of refraction until, upon illumination with light of a predetermined wave length, a minimum of the reflection occurs. If the deposited layer is homogeneous, then the reflection capability of the surface of the glass plate on which the layer has been deposited, should not differ for the respective wave length from the reflection capability of the uncoated glass surface. A layer is then present which conforms to the equation $$\frac{\lambda}{2} = nd,$$

wherein $\lambda$ indicates the respective wave length, $n$ is the index of refraction of the layer material and $d$ is the thickness of the layer. By contrast, a higher reflection capability relative to the uncoated glass surface is obtained if the layer is positively inhomogeneous while a lower reflection capability as compared to that of the uncoated glass surface is obtained if the layer is negatively inhomogeneous.

Experiments have indicated that the invention is particularly advantageously carried out by using starting mixtures in which the element tantalum is present in metallic form while the element zirconium is employed in oxide form. The proportion of metallic tantalum should then not be below 20 percent of the weight of the total mixture. The same applies for the zirconium oxide component. Within these limits the layer produced from such mixtures is surprisingly insignificantly dependent on the mixing ratio of the components in the starting mixture, as has been confirmed by extensive tests and investigations.

For this purpose, different mixtures of tantalum metal and zirconium oxide were produced and deposited on glass plates by vapor deposition from a tungsten crucible. The ratio of the number of tantalum atoms to the number of zirconium atoms in the layer was then determined by X-ray fluorescence analysis. The subsequent Table 1 lists the surprising results for three different layers:

TABLE 1

| Example No. | Weight ratio Ta:$ZrO_2$ in the starting mixture | Ratio of number of atoms Ta/Zr in the starting mixture | Ratio of number of atoms Ta/Zr in the layer (X-ray-fluorescence analysis) |
| --- | --- | --- | --- |
| 1 | 30 : 70 | 1 : 3.3 | 1 : 1.7 |
| 2 | 50 : 50 | 1 : 1.46 | 1 : 1.78 |
| 3 | 70 : 30 | 1 : 0.62 | 1 : 1.36 |

It is clearly apparent from the Table that the ratio of tantalum to zirconium in the deposited layers is substantially constant (within 20%) in spite of the significant change of the ratio in the starting material, the change being by the factor 5.

This characteristic of the inventive procedure constitutes an important development and progress from a manufacturing technical point of view as compared to known vapor deposition procedures. In the prior art procedures, extreme care had to be taken that the composition of the starting material was precisely adhered to in order to obtain the desired result. This is no longer necessary as long as the ratios previously referred to are being adhered to. Further, it has been found that also the other determinative factors of vacuum vapor deposition procedures can be changed within relatively wide limits. Thus, in the prior art procedures, the vaporizing speed or rate was considered a critical factor in the vaporizing of mixtures. With the same starting material, widely different condensates or deposits were obtained with different vaporization speeds. By contrast, in accordance with the invention, a reliable procedure is now available which results without great expenditure in the production of highly refractive light permeable layers of excellent reproducibility.

The following Table 2 lists a number of additional embodiments for the inventive procedure. For all these examples, the following is applicable:

The deposition was carried out in a customary vacuum vapor deposition plant. The starting mixtures were in each case heated in a crucible to a sufficient temperature, for example, 1700° to 1800°C, so as to result in vaporization of the starting mixture. The manner of heating the mixture in the crucible is not critical and can be effected by known ways, for example, a tungsten crucible may be used which is heated by electric resistance heating, or the heating is effected by means of an electron beam. In the latter case, the electron beam is directed onto the surface of the mixture to be vaporized which thus is directly heated to the evaporation temperature. The heat effect of the electron beam is, as is known, the product of the current intensity of the beam and the applied potential. In all the following examples, layers were obtained which are completely homogeneous in the above indicated sense, although the deposition was carried out with a growth rate of the layers on the support of about 350 A per minute up to layer thicknesses of about 300 nm. In order to obtain hard and stable layers which are as absorption free as possible, it is recommended to heat the supports on which the layer is to be deposited prior to the deposition to a temperature of about 300°C. As previously indicated, glass plates form excellent supports for the inventive purposes. Further, dependent on the use to which the layers are to be put, it is recommended to carry out the vaporization and deposition in an oxidizing atmosphere known per se, for example, at an oxygen pressure of about $2 \times 10^{-4}$ mmHg, such as described in U.S. Pat. No. 2,920,002.

TABLE 2

| Example No. | Mixture | Weight ratio | Evaporation by |
|---|---|---|---|
| 4 | $Ta_2O_5 : ZrO_2$ | 30 : 70 | resistance heated tungsten crucible |
| 5 | tantalum-suboxide : $ZrO_2$ | 1 : 1 | electron beam; 2.5 kW |
| 6 | $Ta_2O_5 : Zr$ | 60 : 40 | resistance heated tungsten crucible |
| 7 | $Ta_2O_5$ : zirconium-suboxide | 1 : 1 | resistance heated tungsten crucible |
| 8 | $Ta : ZrO_2$ | 30 : 70 | electron beam; 2.5 kW |

The tantalum-suboxide mentioned in Table 2, may be obtained by melting together a stoichiometric mixture of tantalum metal and tantalum-pentoxide while the mentioned zirconium-suboxide may be obtained by melting together a stoichiometric mixture of zirconium metal and zirconiumdioxide. The melting-together may be effected in advance of the vapor deposition in a preceding step to obtain the respective suboxide, or it may be effected in the vaporizing crucible proper in which event the starting mixture contains three components. In other words, and referring to Example 5, the crucible would be fed with a mixture of metallic tantalum, $Ta_2O_5$ and $ZrO_2$ while, in respect to Example 7, the mixture in the crucible would consist of $Ta_2O_5$, Zr and $ZrO_2$.

As is clear from Examples 1, 2 and 3 of Table 1, the inventive procedure results in the formation of layers of predetermined composition, to wit, the layer consists of oxygen, tantalum and zirconium. It is assumed that in the ideal case, the ratio of the number of atoms of tantalum to the number of atoms of zirconium is about 1 : 1.5. For practical requirements, however, it is not necessary to adhere to this theoretical value, but values deviating therefrom also give excellent results. Further, it has to be considered that the measurement of the ratio is subject to measuring errors. However, it has been ascertained with certainty that the atomic ratio in the inventive layer is always within a limit range and that the ratio of the number of tantalum atoms to the number of zirconium atoms is thus always between 1 : 1 to 1 : 2. Further, investigations by X-ray diagrams have indicated that the inventive layers do not contain any crystalline zirconium oxide, or if crystalline zirconium oxide is contained in them, the amount is extremely small. This explains the superior homogeneity of the inventive layers.

The layers obtained in accordance with the invention may be used for numerous purposes. For example, they are extremely suitable, as already mentioned, for the build-up of multi-layer coatings. Such multi-layer coatings, as compared to single-layer reflection-reducing coatings have the advantage that they result in a significantly stronger reduction of the reflection of a coated surface.

Further, the inventive layers may be successfully employed for interference systems with satisfactory ultra-violet permeability. This is so because the layers up to a value of about 340 nm may be produced without exhibiting any absorption whatsoever.

The single FIGURE shows a support having an inventive layer deposited thereon. Referring now to the drawings, the support 1, in the form of a glass plate, has deposited thereon the layer 2 consisting of tantalum, zirconium and oxygen.

What is claimed is:

1. A method of producing a highly refractive, light permeable optically homogeneous layer on a support, said layer essentially consisting of oxygen, zirconium and tantalum, the ratio of the number of tantalum atoms to zirconium atoms in the layer being in the range of 1 : 1.36 to 1 : 1.7 and the layer being essentially devoid of crystalline zirconium oxide, which comprises heating under vacuum conditions a mixture comprising at least 20 per cent by weight of metallic tantalum and at least 20 per cent by weight of zirconium oxide and in amounts necessary to obtain said ratio thereby to form a vapor, and condensing the vapor on said support.

2. The method of claim 1, wherein the mixture essentially consists of metallic tantalum and zirconium oxide in a ratio of 30 : 70 to 70 : 30.

3. The method as claimed in claim 1, wherein said mixture essentially consists of 50% of metallic tantalum and 50% of zirconium oxide.

4. The method as claimed in claim 1, wherein said vapor formation and condensation are carried out in an oxidizing atmosphere.

5. The method as claimed in claim 1, wherein said support is a glass plate.

6. The method as claimed in claim 1, wherein said support is preheated prior to the formation of said deposit thereon.

7. The method as claimed in claim 6, wherein said glass plate is heated to about 300°C prior to said deposition.

* * * * *